US008711964B2

(12) United States Patent
Kang et al.

(10) Patent No.: US 8,711,964 B2
(45) Date of Patent: Apr. 29, 2014

(54) METHOD AND APPARATUS FOR PRE-SCHEDULING IN CLOSED-LOOP MU-MIMO ANTENNA SYSTEM

(75) Inventors: Seung-Won Kang, Suwon-si (KR); Sung-Woo Park, Suwon-si (KR); Soon-Young Yoon, Seoul (KR); Keun-Chul Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 13/019,366

(22) Filed: Feb. 2, 2011

(65) Prior Publication Data

US 2011/0188599 A1  Aug. 4, 2011

(30) Foreign Application Priority Data

Feb. 4, 2010 (KR) ................. 10-2010-0010556

(51) Int. Cl.
*H04B 7/02* (2006.01)
(52) U.S. Cl.
USPC ........... 375/267; 375/260; 375/229; 375/347; 455/101; 455/132; 455/500; 455/562.1; 370/464; 370/480; 341/173

(58) Field of Classification Search
USPC ................. 375/267, 220, 224, 260, 299, 347; 455/69, 507, 446, 422.1, 101, 132, 455/500, 562.1; 370/464, 480; 341/173
See application file for complete search history.

(56) References Cited

U.S. PATENT DOCUMENTS

| 7,515,878 B2* | 4/2009 | Zhang et al. .................... 455/69 |
| 7,636,553 B2* | 12/2009 | Zhang et al. .................... 455/69 |
| 7,957,701 B2* | 6/2011 | Alexiou et al. ................. 455/69 |
| 8,005,131 B2* | 8/2011 | Li et al. ......................... 375/220 |
| 8,229,443 B2* | 7/2012 | Caire et al. ..................... 455/446 |
| 2010/0113078 A1* | 5/2010 | Farajidana et al. ........... 455/507 |
| 2011/0159866 A1* | 6/2011 | Kim et al. ................... 455/422.1 |
| 2011/0176629 A1* | 7/2011 | Bayesteh et al. .............. 375/267 |

* cited by examiner

*Primary Examiner* — Leon Flores

(57) ABSTRACT

A method and an apparatus for pre-scheduling in a closed-loop multiple user multiple input multiple output (MU-MIMO) antenna system. A base station receives channel information representing a downlink channel condition of each mobile station from mobile stations in a cell, and determines a candidate user group for each of frequency bands included in an entire frequency band, based on the channel information, the candidate user group including mobile stations to which resources can be simultaneously allocated. The base station also instructs a mobile station included in each candidate user group to transmit a sounding signal through a corresponding frequency band. If the sounding signal is received through the corresponding frequency band, the base station performs a scheduling with regard to the mobile station included in each candidate user group.

32 Claims, 9 Drawing Sheets

- ● CODEWORD OF 1ST GROUP USERS WHO CAN RECEIVE DATA AT THE SAME TIME 402
- ◐ CODEWORD OF 2ND GROUP USERS WHO CAN RECEIVE DATA AT THE SAME TIME 404
- ▦ CODEWORD OF 3RD GROUP USERS WHO CAN RECEIVE DATA AT THE SAME TIME 406

METHOD AND APPARATUS FOR PRE-SCHEDULING IN CLOSED-LOOP MU-MIMO ANTENNA SYSTEM

CROSS-REFERENCE TO RELATED APPLICATION(S) AND CLAIM OF PRIORITY

The present application is related to and claims priority under 35 U.S.C. §119(a) to a Korean Patent Application entitled "Method and Apparatus for Pre-Scheduling in Closed Loop MU-MIMO Antenna System" filed in the Korean Industrial Property Office on Feb. 4, 2010 and assigned Serial No. 10-2010-0010556, the contents of which are incorporated herein by reference.

TECHNICAL FIELD OF THE INVENTION

The present invention relates to a Multiple Input Multiple Output (MIMO) antenna system, and more particularly to a method and an apparatus for pre-scheduling in a closed-loop Multiple User-Multiple Input Multiple Output (MU-MIMO) antenna system.

BACKGROUND OF THE INVENTION

Due to the increase of the demand for a high capacity data service, such as a variety of multimedia Internet services, as well as voice calls in a wireless communication market, a variety of wireless transmission technologies have been developed in order to satisfy the demand.

Active research for MIMO technology is in progress lately as a highly attractive field. Since the MIMO system uses multiple antennas at its transmission and reception port, respectively, it may increase a channel transmitting capacity in proportion to the number of antennas without an additional allocation of transmission power or frequency, in comparison with a system using a single antenna.

The MIMO technology can be classified into two techniques including CL-MIMO (Closed-Loop MIMO) and OL-MIMO (Open-Loop MIMO) according to whether a base station uses feedback information of a user in order to obtain information of a downlink (DL) channel. A SU-MIMO (Single-Use MIMO) system, which can transmit data to only one user at a time in the same frequency band, can use both the OL-MIMO scheme and the CL-MIMO scheme, but a MU-MIMO (Multiple-User MIMO) system, which can transmit data to several users at the same time in the same frequency band, can use only the CL-MIMO scheme. With the development of communication systems are developed, an active research for the MU-MIMO system capable of maximizing a system capacity is in progress, and thus the importance of the CL-MIMO scheme has increased.

In order to use the CL-MIMO scheme, in general, a base station recognizes DL channel information of users. The channel information includes Channel Direction Information (CDI) and Channel Quality Information (CQI). The CQI is normally reported from users. A method by which the base station obtains the DL-CDI of users is as follows.

The first method is to use a predetermined codebook, in which a user selects a codeword most accurately representing his/her DL-CDI from the predetermined codebook, and gives a feedback of a corresponding codeword index to the base station. The method of using the codebook has an advantage of reducing a feedback overhead, but has a disadvantage in that there is a limitation in the transmission of the various and accurate DL-CDI due to the use of the finite number of quantized codewords.

The second method is to receive a predetermined sounding signal from a user, in which the base station receives the sounding signal transmitted from the user, estimates UL (Uplink)-CDI, and then uses the UL-CDI as the DL-CDI based on the reciprocity of a channel. The method of using the sounding signal has disadvantages in that the method can be used only in a Time Division Duplex (TDD) system which divides the DL and the UL by a time domain. When several users transmit the sounding signal in the same frequency band at the same time, interference is caused by the sounding signal transmitted from users of other cells so that a quality of the sounding signal received by the base station is degraded. However, the method of using the sounding signal has an advantage in that it is possible to transmit more various and accurate DL-CDI, in comparison with the method of using the codebook.

When all the users transmit the sounding signal to the base station through the entire frequency band by using a part of UL resources in every frame for a DL scheduling of the base station, electric power allocated to the sounding signal for each frequency band decreases, and a quality of the sounding signal received in the base station is degraded due to interference caused by the sounding signal transmitted from users of other cells. As a result, a further problem occurs in that the accuracy of a beam forming matrix is deteriorated.

SUMMARY OF THE INVENTION

To address the above-discussed deficiencies of the prior art, it is a primary object to provide a method and an apparatus for pre-scheduling, which limit the number of users transmitting a sounding signal for each frequency band in a MU CL-MIMO antenna system.

The present invention provides a method and an apparatus for pre-scheduling, which improve the accuracy of a beam forming matrix using the sounding signal.

The present invention provides a method and an apparatus for pre-scheduling, which enable users to transmit the sounding signal with regard to only the selected specific frequency band, thereby increasing electric power allocated to the frequency band.

In accordance with an aspect of the present invention, there is provided a method for pre-scheduling in a Closed-Loop (CL) Multiple User Multiple Input Multiple Output (MU-MIMO) antenna system. The method includes receiving channel information representing a downlink channel condition of each mobile station from mobile stations in a cell. The method also includes determining a candidate user group for each of a plurality of frequency bands included in an entire frequency band based on the channel information, the candidate user group including mobile stations, to which resources can be simultaneously allocated. The method further includes instructing mobile stations included in each candidate user group to transmit sounding signals through a corresponding frequency band. The method also includes performing a scheduling with regard to mobile stations included in said each candidate user group in response to receiving of the sounding signal through the corresponding frequency band.

In accordance with another aspect of the present invention, there is provided a base station apparatus for pre-scheduling in a Closed-Loop (CL) Multiple User Multiple Input Multiple Output (MU-MIMO) antenna system. The base station includes a channel information receiver configured to receive channel information representing a downlink channel condition of each mobile station from mobile stations in a cell. The base station also includes a pre-scheduling unit configured to determine a candidate user group for each of a plurality of frequency bands included in an entire frequency band based on the channel information, the candidate user group including mobile stations, to which resources can be simultaneously allocated. The base station further includes a control channel transmitter configured to command mobile stations included in each candidate user group to transmit sounding signals through a corresponding frequency band. The base station also includes a scheduling unit configured to perform a scheduling with regard to mobile stations included in said each candidate user group in response to receiving of the sounding signals through the corresponding frequency band.

In accordance with another aspect of the present invention, there is provided a method for pre-scheduling in a Closed-Loop (CL) Multiple User Multiple Input Multiple Output (MU-MIMO) antenna system. The method includes transmitting channel information representing a downlink channel condition of a mobile station to a base station. The method also includes receiving notification information instructing to transmit a sounding signal through a specific frequency band of an entire frequency band including a plurality of frequency bands from the base station in response to the channel information. The method further includes transmitting the sounding signal through the specific frequency band. The method also includes performing a data communication with the base station according to a result of a scheduling performed by the base station based on the sounding signal.

In accordance with another aspect of the present invention, there is provided a mobile station apparatus for pre-scheduling in a Closed-Loop (CL) Multiple User Multiple Input Multiple Output (MU-MIMO) antenna system. The mobile station includes a channel information transmitter configured to transmit channel information representing a downlink channel condition of a mobile station to a base station. The mobile station also includes a control channel receiver configured to receive notification information instructing to transmit a sounding signal through a specific frequency band of an entire frequency band including a plurality of frequency bands from the base station in response to the channel information. The mobile station further includes a sounding signal transmitter configured to transmit the sounding signal through the specific frequency band. The method also includes a controller configured to perform a data communication with the base station according to a result of a scheduling performed by the base station based on the sounding signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, a detailed explanation of known related functions and constitutions may be omitted to avoid unnecessarily obscuring the subject matter of the present invention.

Figure 1:
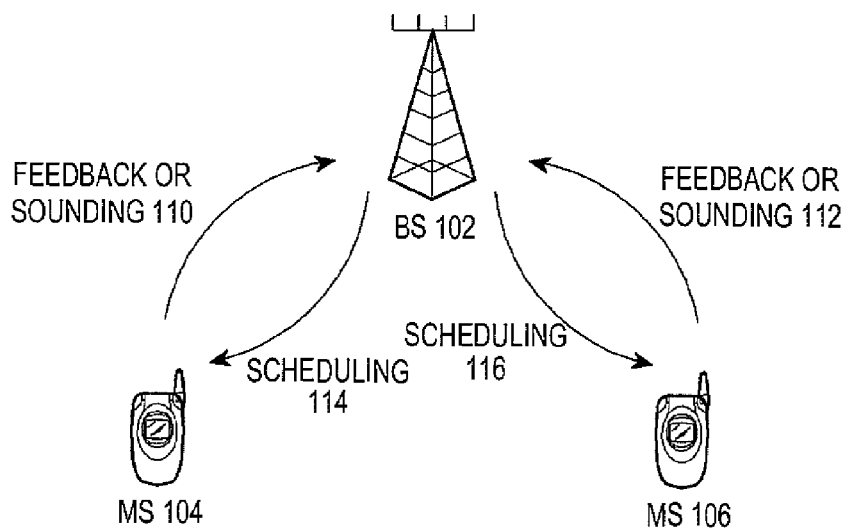
FIG. 1 schematically illustrates a structure of a typical MU-MIMO antenna system.

FIG. 1 schematically illustrates a structure of a typical MU-MIMO antenna system.

With reference to FIG. 1, a base station 102 determines the mobile station to which the base station 102 will allocate resources at the same time by using a multiple antenna through a DL scheduling 114 and 116 in consideration of channel information of all the mobile stations 104 and 106, that is, DL-CDI and CQI. After determining the mobile station to which the resources will be allocated at the same time through the DL scheduling 114, 116, the base station 102 performs a pre-coding for the beam forming of a transmitting signal by using the DL-CDI of the mobile stations 104 and 106. At this time, as the correlation between each DL-CDI is weaker (lower), it becomes easier for the mobile station receiving the DL signal to detect its own signal from the DL signal, which improves the rate of success in receiving data.

In order to enable the base station 102 to support acquisition of DL-CDI of the mobile stations 104 and 106, the mobile stations 104 and 106 transmit a feedback or the sounding signals 110 and 112 representing a code index to the base station 102. The base station 102 constructs the beam forming matrix for the pre-coding by using the codeword index or by using the DL-CDI obtained based on the sounding signal. The DL-CDI means a spatial direction of the DL channel.

Figure 2:
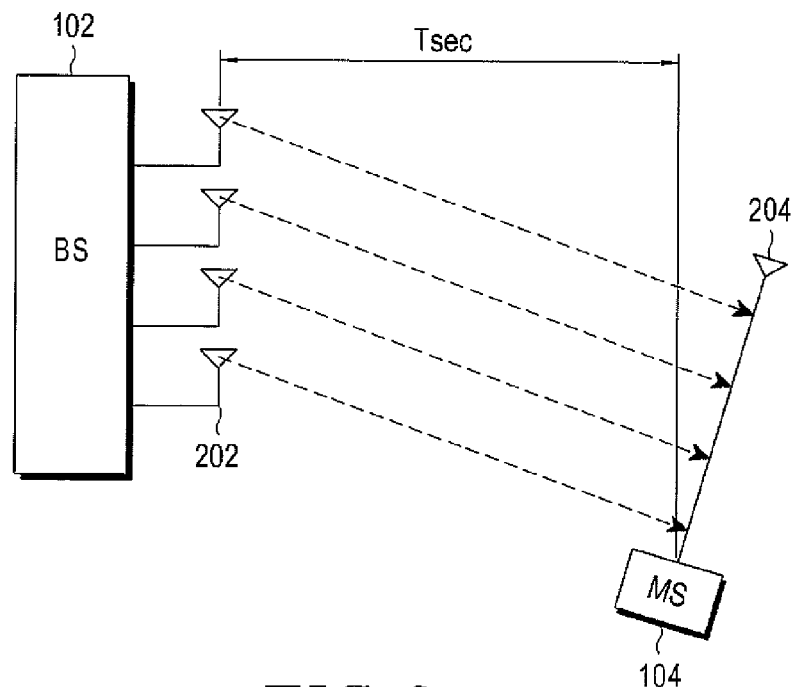
FIG. 2 illustrates CDI obtained by a base station.

FIG. 2 is a view illustrating CDI obtained by a base station.

As illustrated in FIG. 2, when the base station 102 uses the $N_{tx}$ number of transmission (Tx) antennas 202, signals transmitted from each of the Tx antennas 202 are not simultaneously received by the $N_{rx}$ number of reception (Rx) antennas 204 provided at the mobile station 104, respectively, and are received with a time interval of a maximum of T seconds by the $N_{rx}$ number of reception (Rx) antennas 204. Thus, a phase difference occurs between channel values, which are represented with a complex number, of each Tx antenna. Accordingly, a $N_{tx}*N_t$ channel vector measured from the mobile station 104 has a direction. In other words, each of the mobile stations has different CDT according to its own position and channel properties.

A method of using a codebook in order to obtain the DL-CDT may reduce a feedback overhead, but the method has limitations in transmission of the various and accurate DL-CDT since the method uses a limited number of quantized codewords. Alternatively, a method of using a sounding signal may provide more various and accurate channel information, in comparison with the method of using the codeword, so that it achieves an improved beam forming.

The base station performs the DL scheduling in every frame, so all the mobile stations transmit the sounding signal to the base station through the entire frequency band by using a part of UL resources in every frame. In this situation, freedom of the DL scheduling performed by the base station is ensured, but the following problems occur because all the mobile stations transmit the sounding signal through the entire frequency band in every frame.

(1) As limited electric power of the mobile station is distributed to the entire frequency band for transmitting the sounding signal, the electric power allocated to the sounding signals for each frequency band is lowered. Thus, strength of the sounding signal weakens for a noise in comparison with a situation in which the electric signal is allocated to the specific frequency bands. As a result, a quality of the sounding signal received by the base station is degraded.

(2) In comparison with a situation in which only specific users transmit the sounding signal, the sounding signal quality received by the base station is degraded due to interference caused by the sounding signal transmitted, with regard to the same frequency band, from all the mobile stations of other cells.

(3) When using a sounding signal having a low quality, the accuracy of the beam forming matrix is deteriorated.

According to a method, in order to solve the above mentioned problems, each of the mobile stations may select a frequency band with a good condition from the entire frequency band and transmit the sounding signal of the selected frequency band. However, the method described above does not consider a relation between DL-CDI of the mobile stations, thus freedom of the DL scheduling is deteriorated, thereby causing performance degradation.

In exemplary embodiments of the present invention, which are described later, the mobile stations, which are selected through the pre-scheduling of each frequency band, are allowed to transmit the sounding signal with regard to the corresponding frequency band for a predetermined time in order to improve the accuracy of a beam forming matrix. Therefore, it is possible to allocate more electric power to the sounding signal for each specific frequency band, and to limit interference from another cell, thereby improving the sounding signal quality. In some embodiments, all the mobile stations provide the base station with feedback information, such as CQI, to be used in the pre-scheduling process.

Figure 3:
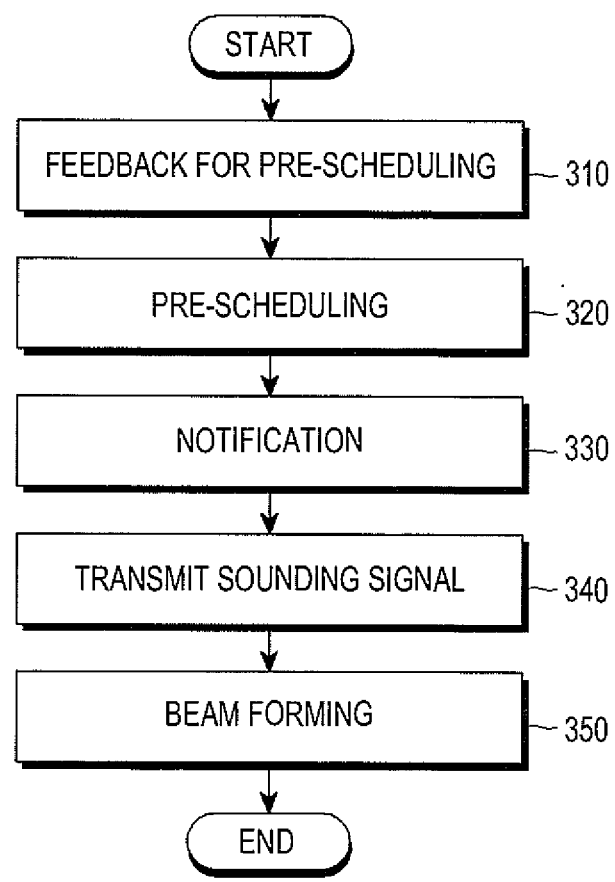
FIG. 3 schematically illustrates an operation of a pre-scheduling according to an embodiment of the present invention.

FIG. 3 is a flowchart schematically illustrating an operation of a pre-scheduling according to an embodiment of the present invention. The pre-scheduling refers to an operation of predetermining a timing and resources for transmission of the sounding signal by the mobile stations prior to a scheduling for transmission and reception of real data.

With reference to FIG. 3, in block 310, all the mobile stations make a feedback of other information (that is, CDI-related information), which can be used at estimation of the CQI and CDI for the pre-scheduling performed by the base station. In block 320, the base station determines a Candidate user Group for each frequency Band (CGB) including candidate mobile stations, to which the resources can be allocated for each frequency band at the same time, by performing the pre-scheduling with using channel information, which includes the CQI and the CDI-related information, received from the mobile stations. In block 330, the base station commands the mobile stations corresponding to each CGB to transmit the sounding signal of the corresponding frequency band. In block 340, the mobile stations corresponding to each CGB transmit the sounding signal through the corresponding frequency band for a predetermined time (T-frames).

The following describes the above mentioned process in detail.

First, a feedback for a pre-scheduling of block 310 is discussed.

Types of channel information used when determining a CGB, which can receive data from a multiple antenna at the same time, are divided into three types as follows.

Type 1. Codeword Index & CQI
Type 2. Sounding Signal & CQI
Type 3. Uplink (UL) Control Channel Signal & CQI Type 1 is a method to use a predetermined codebook. All the mobile stations select a codeword, most accurately representing its own DL-CDI for each frequency band with regard to all usable frequency bands, from the predetermined codebook, and then transmit the CQI together with the selected codeword index to the base station. In some embodiments, the number of bits of the used codeword index complies with a condition of the following Equation (1).

$$2^{N\_codebook} \geq N_{group\_user} \quad [\text{Eqn. 1}]$$

In Equation 1, N_codebook represents the number of bits used in the codebook, that is, a length of the codeword index, and $N_{Group\_user}$ represents the number of mobile stations included in each candidate user group.

For a pre-scheduling, either the same codebook as that used for the pre-scheduling in the base station or a separate codebook (PS codebook) only for the pre-scheduling may be used.

Figure 4:
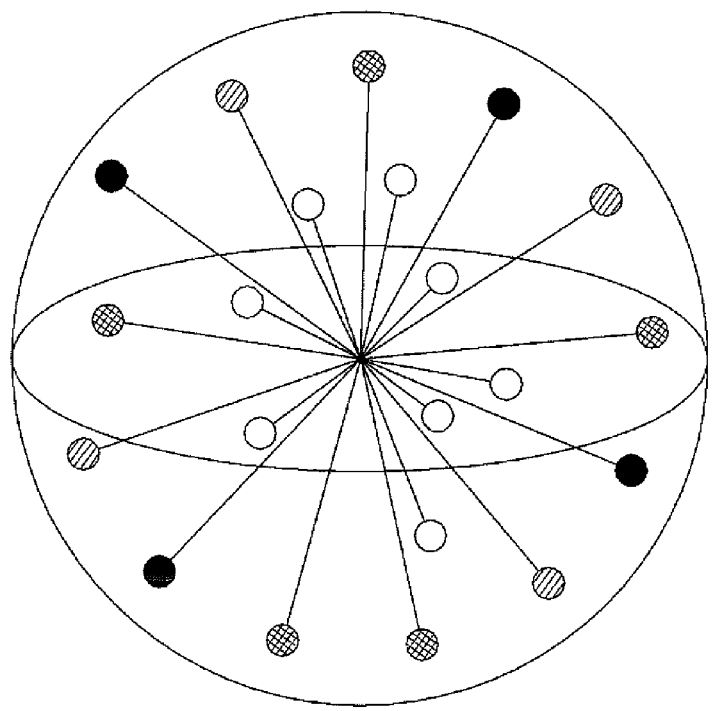
FIG. 4 illustrates an example of a PS codebook including n bits codewords.

FIG. 4 illustrates an example of a PS codebook including n bit codewords. As illustrated in FIG. 4, the $2^n$ number of constellations indicated on a sphere represents a direction of each codeword. The constellations placed close to each other have a high correlation between them, and the constellations placed far from each other have a low correlation between them. The mobile stations, which can receive data from multiple antennas of the base station at the same time, are grouped into a plurality of candidate user groups. In some embodiments, the codewords of users of each group are orthogonal to each other or have a low correlation. FIG. 4 illustrates the codewords 402, 404, and 406 of the mobile stations included in first to third groups.

Figure 5:
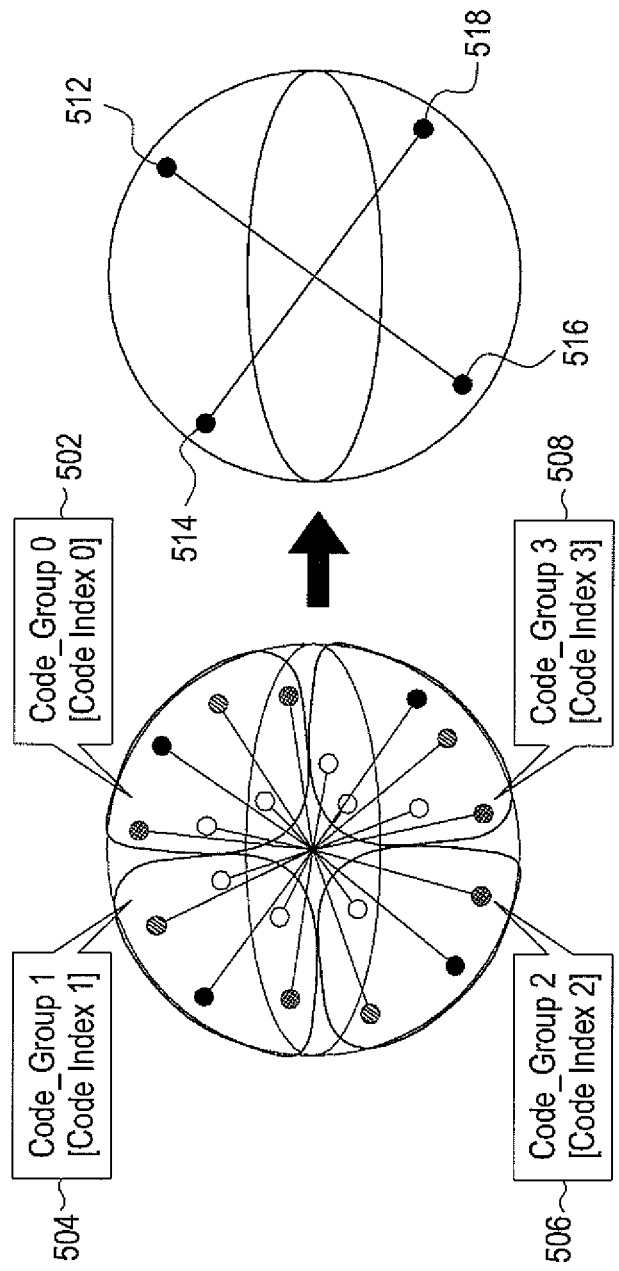
FIG. 5 illustrates another example of a PS codebook including m bits codewords.

FIG. 5 illustrates another example of a PS codebook including m bit codewords. Here, and the above mentioned condition of Equation 1 is satisfied. Further, it is assumed that m=2 and the number of transmission antennas ($N_{tx}$) provided at a base station is 4.

With reference to FIG. 5, when the number of bits of the PS codebook decreases to 2 bits, constellations having a high correlation are grouped and mapped to one constellation. Specifically, codeword group 0 (Code_Group 0) 502 is mapped to codeword index #0 512, codeword group 1 (Code_Group 1) 504 is mapped to codeword index #1 514, codeword group 2 (Code_Group 2) 506 is mapped to codeword index #2 516, and codeword group 3 (Code_Group 3) 508 is mapped to codeword index #3 518.

Accordingly, when the 2 bit PS codebook is used, the codewords of the mobile stations, which are not grouped due to a high correlation between codewords of the mobile stations when the n bit (2≤n) PS codebook is used, are mapped to the same codeword so that the corresponding mobile stations may not receive data at the same time. Alternatively, when the 2 bit PS codebook is used, the codewords of the mobile stations, which are grouped into the same group because the codewords are mutually orthogonal or have a low correlation when the n bit PS codebook is used, are mapped to separate codewords, respectively, so that the corresponding mobile stations may receive data at the same time. Due to the properties described above, it reduces the number of bits of the PS codebook with hardly affecting the pre-scheduling, thereby reducing the feedback overhead.

Type 1 channel information may be applied to one of the following type 1-1, type 1-2, type 1-3, and type 1-4.

Type 1-1. Subband codeword index & Subband CQI
Type 1-2. Subband codeword index & Wideband CQI
Type 1-3. Wideband codeword index & Subband CQI
Type 1-4. Wideband codeword index & Wideband CQI In the above examples, the subband CQI represents a channel quality measured with regard to each subband (that is, frequency band), the wideband CQI represents a channel quality measured with regard to the entire frequency band including a plurality of frequency bands, the subband codeword index represents a codeword index selected with regard to each subband, and the wideband codeword index represents a codeword index selected with regard to the entire frequency band.

Type 2 is a method by which the mobile stations transmit the CQI together with the sounding signal through the entire frequency band to the base station. The base station receives the sounding signal transmitted from the mobile station, estimates UL-CDI, and then estimates DL-CDI from the UL-CDI based on reciprocity of the channel. The candidate user group is configured by using the DL-CDI estimated as above and the feedbacked CQI. Type 2 may be applied to one of the following type 2-1 and type 2-2.

Type 2-1. Sounding signal+Subband CQI
Type 2-2. Sounding signal+Wideband CQI

The sounding signal received through the entire frequency band has interference, and the like, caused by users of other cells. However, the sounding signal is not directly used in the scheduling, but is used, with the CQI, in the pre-scheduling, thereby not mortally affecting the beam forming.

Type 3 is a method of using a UL control channel and the CQI. The base station estimates UL-CDI by using a pilot signal included in the UL control channel, and estimates DL-CDI from the UL-CDI based on reciprocity of the channel. The CQI may refer to the subband CQI or the wideband CQI.

Next, block 320 for the pre-scheduling is described.

The base station configures a candidate user group by using CQI included in channel information received from all the mobile stations and DL-CDI estimated based on the CDI-related information included in the channel information in block 310. In an ideal situation, the mobile station, which is determined to receive data from multiple antennas provided at the base station, transmits the sounding signal for the beam forming in the base station so that a receiving quality of the sounding signal is ensured as much as possible. However, this is difficult or impossible to realize.

For implementation of the pre-scheduling as close to the ideal situation as possible, the base station configures a candidate user group, for each frequency band, including candidate mobile stations, which can receive data at the same time and make a maximum Weighted Sum Rate (WSR), in consideration of fairness and a system capacity by using the CQI and the DL-CDI. For example, the number of the mobile stations ($N_{group\_user}$) included in one candidate user group is determined according to the following Equation 2:

$$N_{Group\_user} \geq N_{min} \quad [\text{Eqn. 2}]$$

$$N_{min} = \min(N_{tx}, N_{MaxUser}, N_{User})$$

In Equation 2, $N_{Group\_user}$ represents the number of the mobile stations included in each candidate user group, $N_{tx}$ represents the number of the transmission antennas, $N_{MaxUser}$ represents the maximum number of the mobile stations, which can support one frequency band at the same time, and $N_{User}$ represents the number of the mobile stations existing in one cell.

The WSR, as an example, is obtained according to the following Equation 3.

$$WS = \sum_{k=0}^{K-1} W_k R_k \quad [\text{Eqn. 3}]$$

$$W_k = \frac{1}{\overline{R}_k}, \quad \overline{R}_k = \text{average\_data\_rate}$$

In Equation 3, K represents the number of the mobile stations selected through the pre-scheduling, $W_k$ represents a positive weight for the mobile station k changeable according to time, and $R_k$ represents an instantaneous data rate for the mobile station k.

Referring back now to FIG. 3, block 330 for notification is described.

The base station informs the users, which are selected through the pre-scheduling of block 320, of a specific frequency band for transmitting the sounding signal. For example, the specific frequency band may be notified through a bitmap. In other words, each bit of the bit map is mapped in each frequency band included in the entire frequency band, and allocated to "1" or "0" or not allocated.

Block 340 for transmission of the sounding signal is now described.

Each of the mobile stations receives allocation of a frequency band for transmitting the sounding signal through notification information including the bit map, and the like, and transmits the sounding signal to the base station during a predetermined time, e.g., T frame, for the pre-coding. The CQI for each frequency band may be transmitted together with the sounding signal.

Figure 6:
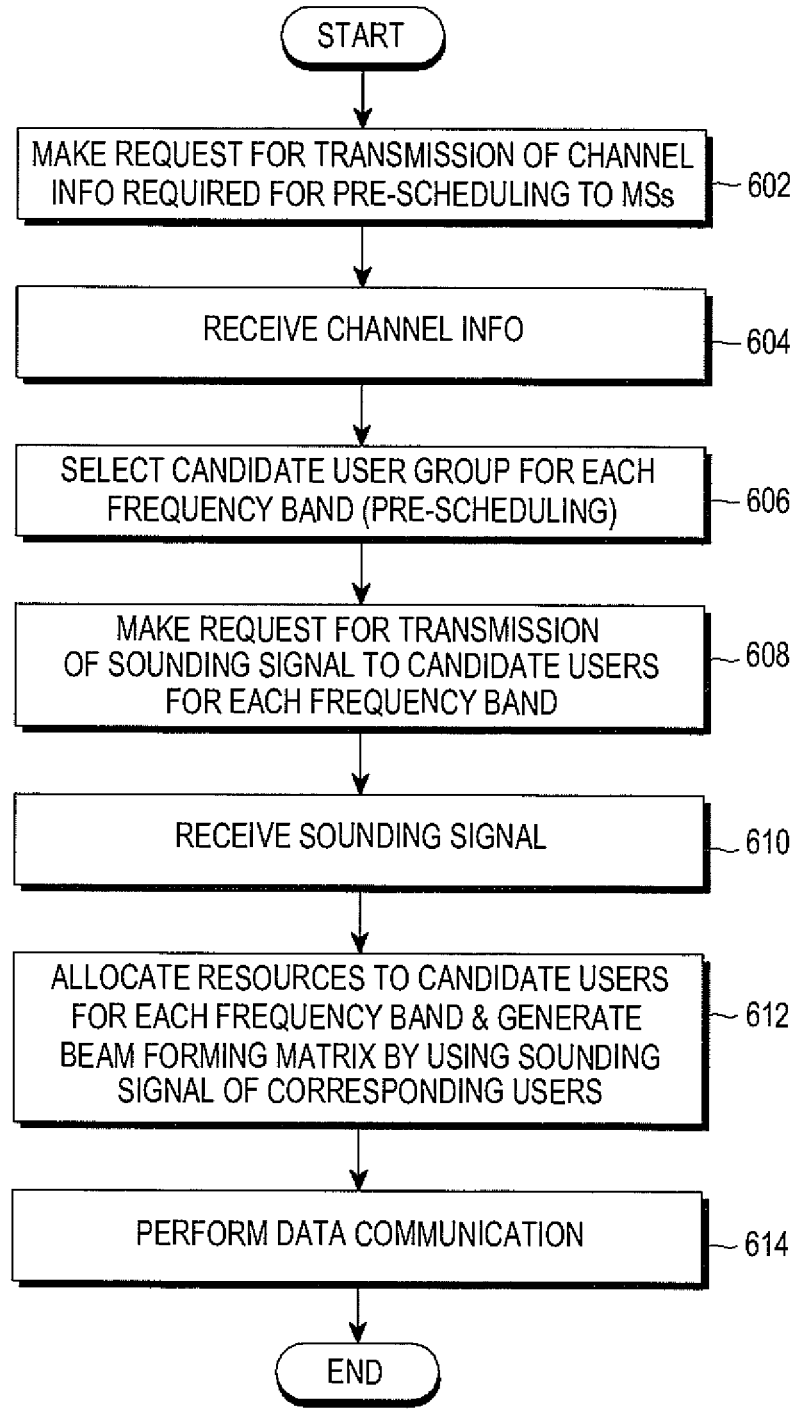
FIG. 6 illustrates an operation of a base station according to an embodiment of the present invention.

FIG. 6 illustrates an operation of a base station according to an embodiment of the present invention. The operation, which is described later, is performed on a predetermined cycle. For example, it is repeatedly performed every T frame.

With reference to FIG. 6, in block 602, the base station makes a request for channel information associated with the pre-scheduling to the mobile station, which is a subject of the scheduling in a cell. The request is completed by clearly indicating a specific type of channel information, requested from the base station, among types 1-1, 1-2, 1-3, 1-4, types 2-1, 2-2, and type 3. In block 604, in response to the request, the base station receives the CQI for each frequency band (that is, subband CQI) or the CQI of the entire frequency band (that is, wideband CQI) together with the CDI-related information including the codeword index, the sounding signal, or the UL control channel signal, as channel information, from the mobile stations.

In block 606, the base station determines the CGB including the selected candidate mobile stations, which will transmit the sounding signal, by estimating the DL-CDI, with reference to the channel information, and performing the pre-scheduling with regard to the mobile stations, with reference to the estimated DL-CDI.

In block 608, the base station transmits notification information instructing the candidate mobile stations included in the CGB to transmit the sounding signal. The notification information includes a frequency band for transmitting the sounding signal by each candidate mobile station. For example, the notification information includes a bitmap, which indicates an allocated frequency band of the entire frequency band. According to an embodiment, the candidate mobile stations included in each candidate user group use the same frequency bands for transmitting the sounding signal, and the candidate mobile stations included in the separate candidate user group use different frequency bands for transmitting the sounding signal.

In block 610, the base station receives the sounding signal through the allocated frequency band from the candidate mobile stations for each frequency band. In block 612, the base station measures UL-CDI of each candidate mobile station by using the sounding signal, and then estimates DL-CDI of each candidate mobile station based on the UL-CDI. The DL-CDI is used in the scheduling of the candidate mobile stations by the base station. In other words, the base station finally selects mobile stations, which will transmit and receive data, from the candidate mobile stations, and configures a beam forming matrix based on the CQI with regard to the selected mobile stations. In block 614, the base station performs to transmit the data to the selected mobile stations and to receive the data from the selected mobile stations by using the beam forming matrix.

Figure 7:
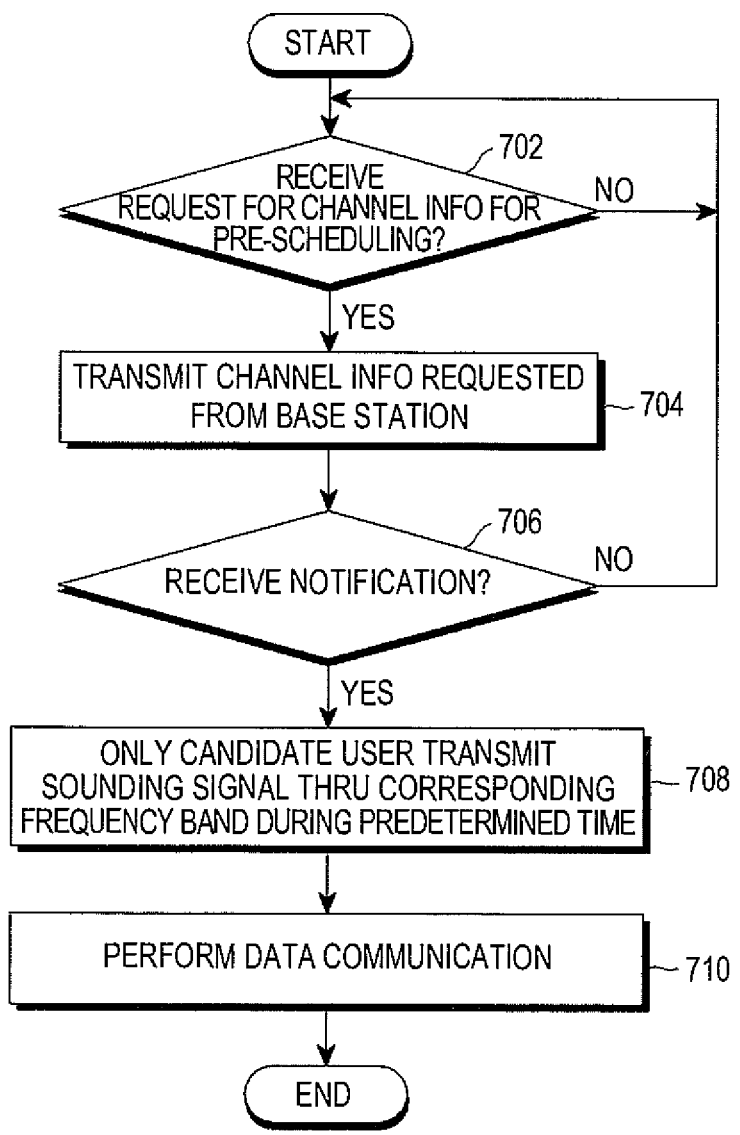
FIG. 7 illustrates an operation of a mobile station according to an embodiment of the present invention.

FIG. 7 is a flowchart illustrating an operation of a mobile station according to an embodiment of the present invention.

With reference to FIG. 7, in block 702, the mobile station waits to receive request information making a request for channel information associated with the pre-scheduling from the base station. If the mobile station receives the request information, in block 704, the mobile station configures the corresponding channel information according to a type of the channel information, and transmits the channel information to the base station. In block 706, the mobile station determines if the notification information instructing to transmit the sounding signal from the base station is received. If the notification information is not received, the mobile station determines that the notification information is excluded from the pre-scheduling performed by the base station, and the operation returns to block 702. Alternatively, if the notification information is received, the operation proceeds to block 708.

In block 708, the mobile station generates the sounding signal, and transmits the sounding signal through the frequency band instructed by the notification information during a predetermined time. In block 710, the mobile station may perform a data communication with the base station according to the scheduling from the base station.

Figure 8:
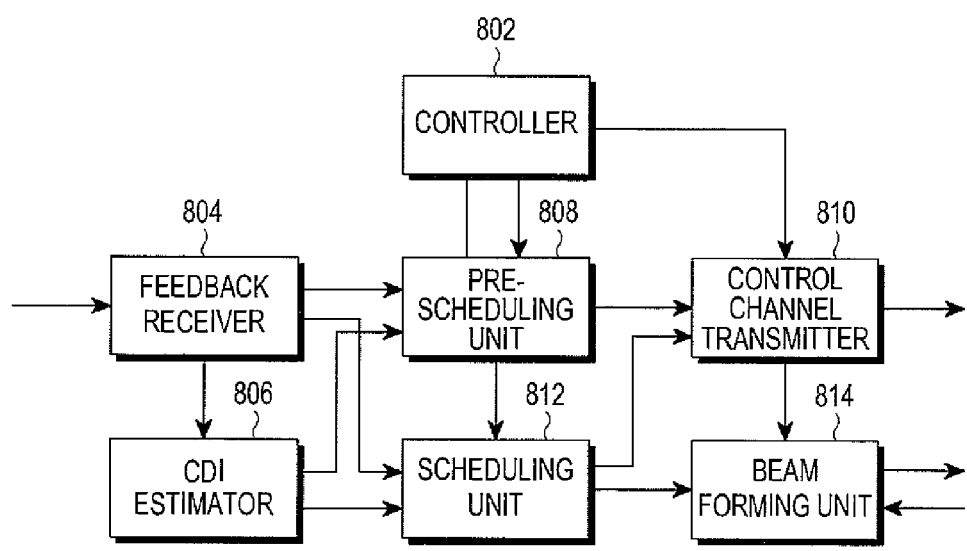
FIG. 8 schematically illustrates a structure of a base station according to an embodiment of the present invention.

FIG. 8 is a block diagram schematically illustrating a structure of a base station according to an embodiment of the present invention.

With reference to FIG. 8, if feedback information transmitted from the mobile stations in a cell exists, a feedback receiver 804 receives the feedback information, extracts CQI and/or a codeword index included in the feedback information, and transmits the extracted CQI and/or the extracted codeword index to a pre-scheduling unit 808 and a scheduling unit 812. If the sounding signal or a UL control channel signal transmitted from the mobile stations in a cell exists, a CDI estimator 806 receives the sounding signal or the UL control channel signal, estimates UL-CDI and/or DL-CDI from the received signal, and transmits an estimated result to the pre-scheduling unit 808 and the scheduling unit 812.

The pre-scheduling unit 808 determines a CGB including candidate mobile stations, to which resources can be allocated for each frequency band at the same time, by using the information transmitted from the receiver 804 and/or the estimated CDI, under the control of controller 802. At this time, the pre-scheduling unit 808 shares the same codebook as that of the scheduling unit 812 or has a separate PS codebook for the pre-scheduling, and uses the same codebook as that of the scheduling unit 812 or the separate PS codebook in order to determine the candidate user group.

According to a result determined by the pre-scheduling unit 808 and the control by the controller 802, a control channel transmitter 810 generates notification information instructing the mobile stations corresponding to each candidate user group to transmit the sounding signal through the corresponding frequency band, and transmits the generated notification information to the mobile stations through the control channel.

The scheduling unit 812 determines the mobile stations to which resources, which will be used for the data communication, are allocated, by performing the scheduling with using the information extracted from the feedback receiver 804 and/or the estimated CDI, under the control of the controller 802. The scheduling is performed by using the CDI estimated by using the sounding signal transmitted from the candidate mobile stations selected according to a result of the pre-scheduling. The scheduling unit 812 instructs the control channel transmitter 810 to transmit the control signal representing the result of the scheduling to the mobile stations determined to receive allocation of the resources, and instructs a beam forming unit 814 to perform the data communication by using the beam forming matrix according to a result of the scheduling.

Figure 9:
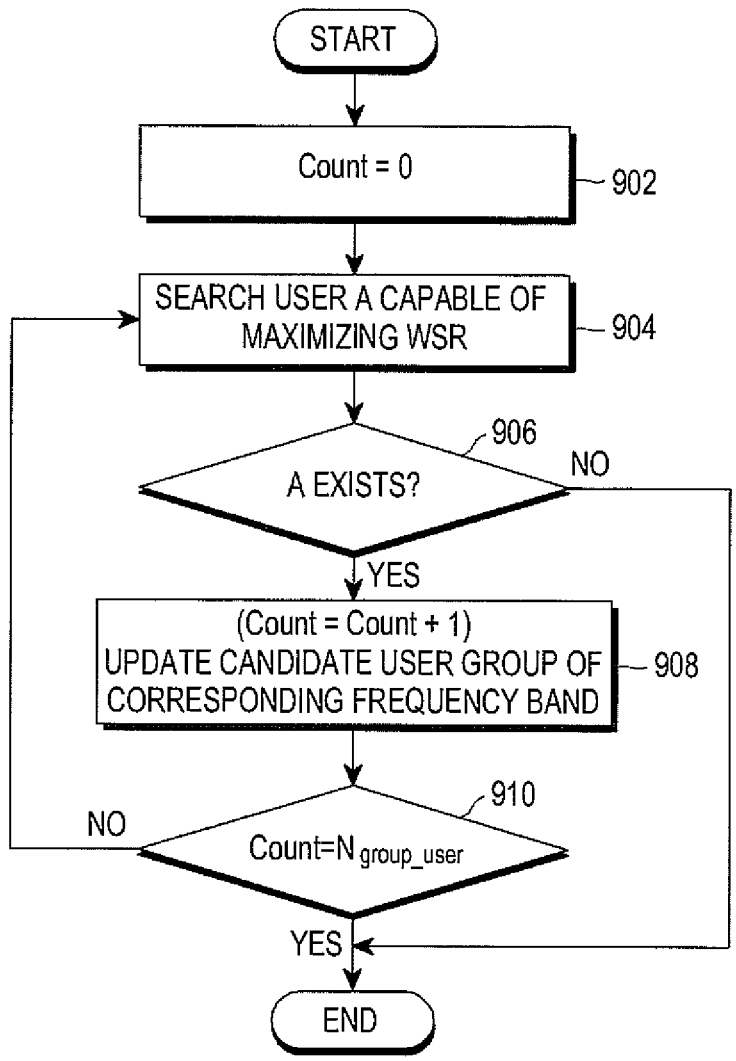
FIG. 9 illustrates an operation of a pre-scheduling according to an embodiment of the present invention.

FIG. 9 is a flowchart illustrating an operation of a pre-scheduling according to an embodiment of the present invention. In FIG. 9, an example using a Greedy algorithm known as an example of the operation of the pre-scheduling is illustrated.

With reference to FIG. 9, in block 902, a base station initializes a variable (Count) for counting the number of users included in each candidate user group to 0. In block 904, the base station searches if a mobile station A, which is capable of maximizing a WSR based on the CQI and the DL-CDI obtained from the mobile stations in a cell, exists. For example, the WSR is obtained according to the following Equation 4.

$$WSR = \sum_{m=0}^{Count} R_{g,m} + R_a \quad \text{[Eqn. 4]}$$

In Equation 4, $R_a$ represents a weighted transmission rate of the mobile station A, and $R_{g,m}$ represents a weighted transmission rate of the $m^{th}$ mobile station of the $g^{th}$ candidate user group.

In block 906, if the mobile station A capable of maximizing the WSR does not exist, the operation is terminated. If the mobile station A capable of maximizing the WRS exists, in block 908, the base station increases Count by 1, determines the mobile station A as the Count$^{th}$ mobile station of the $g^{th}$ group to update a candidate user group of a corresponding frequency band (i.e., $g^{th}$ group), and then proceeds to block 910. In block 910, the base station determines if Count reaches $N_{Group\_user}$ representing the number of mobile stations of each candidate user group. If Count reaches $N_{Group\_user}$, the operation is terminated, and if Count does not reach $N_{Group\_user}$, the operation returns to the block 904.

Figure 10:
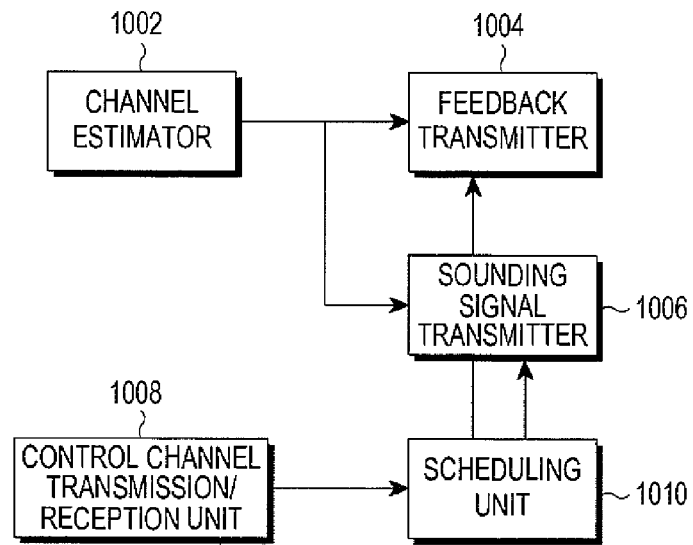
FIG. 10 schematically illustrates a structure of a mobile station according to an embodiment of the present invention.

FIG. 10 is a block diagram schematically illustrating a structure of a mobile station according to an embodiment of the present invention.

With reference to FIG. 10, a channel estimator 1002 performs a channel estimation with regard to a DL channel by using a DL signal received from a base station. A feedback transmitter 1004 generates and transmits a type of feedback information, which is at least one CQI and/or at least one codeword index, requested by the base station, with reference to a result of the channel estimation, under the control of a controller 1010. A sounding signal transmitter 1006 transmits the sounding signal through the entire frequency band for the pre-scheduling or a frequency band allocated for the scheduling, under the control of the controller 1010. A control channel transmission/reception unit 1008 generates a control channel signal including a pilot for the pre-scheduling and transmits the control channel signal to the base station, under the control of the controller 1010. In addition, the control channel transmission/reception unit 1008 receives request information making a request for transmission of channel information from the base station and notification information representing a frequency band for transmitting the sounding signal, and transmits the request information and the notification information to the controller 1010, under the control of the controller 1010.

If the request information is transmitted from the control channel transmission/reception unit 1008, the controller 1010 transmits the channel information requested from the base station to the base station by controlling at least one of the feedback transmitter 1004, the sounding signal transmitter 1006, and the control channel transmission/reception unit 1008 according to the request information. If the notification information is transmitted from the control channel transmission/reception unit 1008, the controller 1010 transmits the sounding signal through a frequency band allocated by the base station by controlling the sounding signal transmitter 1006. When the mobile station is scheduled, based on the sounding signal, by the base station, the controller 1010 performs a data communication with the base station.

Figure 11:
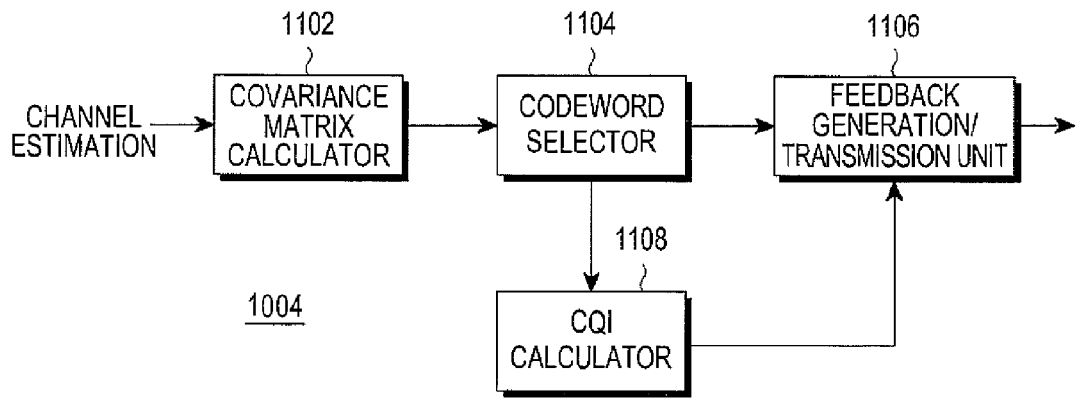
FIG. 11 illustrates a structure of a feedback transmitter according to an embodiment of the present invention.

FIG. 11 is a block diagram illustrating a structure of a feedback transmitter 1004 according to an embodiment of the present invention.

With reference to FIG. 11, a covariance matrix calculator 1102 calculates the covariance matrix representing channel properties by using a result of channel estimation from a channel estimator 1002. A codeword selector 1104 selects a codeword for each frequency band corresponding to the covariance matrix or a codeword of the entire frequency band corresponding to the covariance matrix, with reference to a predetermined codebook. At this time, the codeword selector 1104 may use a pre-scheduling codebook or a general codebook according to whether a feedback is for the pre-scheduling or for the scheduling. A CQI calculator 1108 determines CQI for each frequency band or CQI of the entire frequency band based on the selected codeword or a result of the channel estimation.

A feedback generation/transmission unit 1106 configures at least one of the codeword index with regard to at least one codeword transmitted from the selector 1104 and at least one CQI transmitted from the CQI calculator 1108, as channel information according to a predetermined format, and transmits the channel information to the base station.

Figure 12:
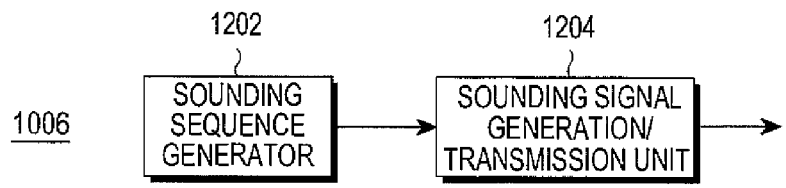
FIG. 12 illustrates a structure of a sounding signal transmitter according to an embodiment of the present invention.

FIG. 12 is a block diagram illustrating a structure of a sounding signal transmitter 1006 according to an embodiment of the present invention.

With reference to FIG. 12, when transmission of the sounding signal is requested, a sounding sequence generator 1202 generates and outputs a predetermined sounding sequence. A sounding signal generation/transmission unit 1204 generates a sounding signal including the sounding sequence and transmits the sounding signal to the base station through the entire frequency band or the frequency band allocated by the base station.

The effects of the present invention are as follows.

According to the present invention, freedom of a DL scheduling is ensured by using DL-CDI and CQI of all users for a pre-scheduling.

Further, according to the present invention, when a codebook for the pre-scheduling is used, a feedback overhead is declined.

Moreover, according to the present invention, the users selected through the pre-scheduling transmit a sounding signal with regard to the corresponding frequency band so that electric power of a mobile station is concentrated in the above mentioned frequency band, thereby improving a sounding signal quality.

Furthermore, according to the present invention, the users selected through the pre-scheduling transmit the sounding signal of the corresponding frequency band so that the number of the users transmitting the sounding signal in the above mentioned frequency band is limited and interference caused by the sounding signal transmitted from users of other cells is declined, thereby improving the sounding signal quality.

In addition, according to the present invention, the sounding signal, of which quality has improved through the pre-scheduling, is used so that the accuracy of abeam forming matrix is increased, which improves the rate of success in receiving data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for pre-scheduling in a Closed-Loop (CL) Multiple User Multiple Input Multiple Output (MU-MIMO) antenna system, the method comprising:
    receiving channel information representing a downlink channel condition of each mobile station in a plurality of mobile stations in a cell;
    determining a plurality of candidate user groups associated with a plurality of frequency bands included in an entire frequency band, based on the channel information, each candidate user group comprising mobile stations to which resources can be simultaneously allocated in the corresponding frequency band;

instructing the mobile stations in each candidate user group to transmit sounding signals through the frequency band associated with the each candidate user group; and performing a scheduling with regard to the mobile stations in the each candidate user group in response to receiving the sounding signals through the frequency band associated with the each candidate user group, wherein each of the plurality of candidate user groups is respectively associated with one of the plurality of frequency bands.

2. The method as claimed in claim 1, wherein the channel information comprises at least one of Channel Quality Information (CQI) and Channel Direction Information (CDI)-related information.

3. The method as claimed in claim 2, wherein the CQI comprises at least one of a wideband CQI representing a channel quality of the entire frequency band and a subband CQI representing a channel quality of each of a plurality of frequency bands.

4. The method as claimed in claim 2, wherein the CDI-related information is obtained by using at least one of codeword information on at least one codeword representing downlink CDI of the mobile stations, a predetermined sounding signal, and an uplink control channel signal comprising a pilot.

5. The method as claimed in claim 4, wherein the codeword information comprises one of a wideband codeword index representing CDI of the entire frequency band and a subband codeword index representing CDI of each of a plurality of frequency bands.

6. The method as claimed in claim 5, wherein the codeword information is selected from a pre-scheduling codebook comprising codewords for the pre-scheduling rather than a codebook comprising codewords for the scheduling, and a codeword length of the pre-scheduling codebook is determined according to a number of mobile stations included in the each candidate user group.

7. The method as claimed in claim 1, wherein the each candidate user group comprises mobile stations that are configured to simultaneously receive data through a corresponding frequency band and that make a maximum Weighted Sum Rate (WSR), wherein the maximum WSR is calculated as a sum of multiplications of positive weights of the mobile stations and instantaneous data rates of the mobile stations.

8. The method as claimed in claim 1, further comprising:
transmitting request information representing a type of the channel information; and
making a request for transmission of the channel information to the mobile stations in the cell.

9. A base station apparatus for pre-scheduling in a Closed-Loop (CL) Multiple User Multiple Input Multiple Output (MU-MIMO) antenna system, the base station apparatus comprising:

a channel information receiver configured to receive channel information representing a downlink channel condition of each mobile station in a plurality of mobile stations in a cell;

a pre-scheduling unit configured to determine a plurality of candidate user groups associated with a plurality of frequency bands included in an entire frequency band, based on the channel information, each candidate user group comprising mobile stations to which resources can be simultaneously allocated in the corresponding frequency band;

a control channel transmitter configured to command the mobile stations in each candidate user group to transmit sounding signals through the frequency band associated with the each candidate user group; and a scheduling unit configured to perform a scheduling with regard to the mobile stations in the each candidate user group in response to receiving the sounding signals through the frequency band associated with the each candidate user group, wherein each of the plurality of candidate user groups is respectively associated with one of the plurality of frequency bands.

10. The base station apparatus as claimed in claim 9, wherein the channel information comprises at least one of channel quality information (CQI) and channel direction information (CDI)-related information.

11. The base station apparatus as claimed in claim 10, wherein the CQI comprises at least one of a wideband CQI representing a channel quality of the entire frequency band and a subband CQI representing a channel quality of each of a plurality of frequency bands.

12. The base station apparatus as claimed in claim 10, wherein the CDI-related information is obtained by using at least one of codeword information with regard to at least one codeword representing downlink CDI of the mobile stations, a predetermined sounding signal, and an uplink control channel signal comprising a pilot.

13. The base station apparatus as claimed in claim 12, wherein the codeword information comprises one of a wideband codeword index representing CDI of the entire frequency band and a subband codeword index representing CDI of each of a plurality of frequency bands.

14. The base station apparatus as claimed in claim 13, wherein the codeword information is selected from a pre-scheduling codebook comprising codewords for the pre-scheduling, rather than a codebook comprising codewords for the scheduling, and a codeword length of the pre-scheduling codebook is determined according to a number of mobile stations included in the each candidate user group.

15. The base station apparatus as claimed in claim 9, wherein the each candidate user group comprises mobile stations that are configured to simultaneously receive data through a corresponding frequency band and that make a maximum Weighted Sum Rate (WSR), wherein the maximum WSR is calculated as a sum of multiplication of a positive weight of each mobile station and an instantaneous data rate of each mobile station.

16. The base station apparatus as claimed in claim 9, wherein the control channel transmitter transmits the request information, which represents a type of the channel information, and makes a request for transmission of the channel information, to the mobile stations in the cell.

17. A method for pre-scheduling in a Closed-Loop (CL) Multiple User Multiple Input Multiple Output (MU-MIMO) antenna system, the method comprising:

transmitting channel information representing a downlink channel condition of a mobile station to a base station;

receiving notification information instructing to transmit a sounding signal through a specific frequency band of an entire frequency band comprising a plurality of frequency bands from the base station in response to the channel information, each of the plurality of frequency bands respectively associated with a corresponding candidate user group, the mobile station associated with at least one of the candidate user groups;

transmitting the sounding signal through the specific frequency band; and performing a data communication with the base station according to a result of a scheduling performed by the base station based on the sounding signal.

18. The method as claimed in claim 17, wherein the channel information comprises at least one of channel quality information (CQI) and channel direction information (CDI)-related information.

19. The method as claimed in claim 17, wherein the CQI comprises at least one of a wideband CQI representing a channel quality of the entire frequency band and a subband CQI representing a channel quality of each of the plurality of frequency bands.

20. The method as claimed in claim 18, wherein the CDI-related information is obtained by using at least one of codeword information on at least one codeword representing downlink CDI of the mobile station, a predetermined sounding signal, and an uplink control channel signal comprising a pilot.

21. The method as claimed in claim 20, wherein the codeword information comprises one of a wideband codeword index representing CDI of the entire frequency band and a subband codeword index representing CDI of each of the plurality of frequency bands.

22. The method as claimed in claim 21, wherein the codeword information is selected from a pre-scheduling codebook comprising codewords for the pre-scheduling, rather than a codebook comprising codewords for the scheduling, and a codeword length of the pre-scheduling codebook is determined according to a number of mobile stations included in the each candidate user group.

23. The method as claimed in claim 17, further comprising receiving request information representing a type of the channel information and making a request for transmission of the channel information from the base station.

24. The method as claimed in claim 17, wherein the specific frequency band is commonly allocated to mobile stations having a direction farthest away from each other.

25. A mobile station apparatus for pre-scheduling in, a Closed-Loop (CL) Multiple User Multiple Input Multiple Output (MU-MIMO) antenna system, the mobile station apparatus comprising:

a channel information transmitter configured to transmit channel information representing a downlink channel condition of a mobile station to a base station;

a control channel receiver configured to receive notification information instructing to transmit a sounding signal through a specific frequency band of an entire frequency band comprising a plurality of frequency bands from the base station in response to the channel information, each of the plurality of frequency bands respectively associated with a corresponding candidate user group, the mobile station associated with at least one of the candidate user groups;

a sounding signal transmitter configured to transmit the sounding signal through the specific frequency band; and a controller configured to perform a data communication with the base station according to a result of a scheduling performed by the base station based on the sounding signal.

26. The mobile station apparatus as claimed in claim 25, wherein the channel information comprises at least one of channel quality information (COI) and channel direction information (CDI)-related information.

27. The mobile station apparatus as claimed in claim 26, wherein the CQI comprises at least one of a wideband CQI representing a channel quality of the entire frequency band and a subband CQI representing a channel quality of each of the plurality of frequency bands.

28. The mobile station apparatus as claimed in claim 26, wherein the CDI-related information is obtained by using at least one of codeword information on at least one codeword representing downlink CDI of the mobile stations, a predetermined sounding signal, and an uplink control channel signal comprising a pilot.

29. The mobile station apparatus as claimed in claim 28, wherein the codeword information comprises one of a wideband codeword index representing CDI of the entire frequency band and a subband codeword index representing CDI of each of the plurality of frequency bands.

30. The mobile station apparatus as claimed in claim 29, wherein the codeword information is selected from a pre-scheduling codebook comprising codewords for the pre-scheduling, rather than a codebook comprising codewords for the scheduling, and a codeword length of the pre-scheduling codebook is determined according to a number of mobile stations included in the each candidate user group.

31. The mobile station apparatus as claimed in claim 25, wherein the control channel receiver receives request information, which represents a type of the channel information and makes a request for transmission of the channel information, from the base station.

32. The mobile station apparatus as claimed in claim 25, wherein the specific frequency band is commonly allocated to mobile stations having a direction farthest away from each other.

* * * * *